United States Patent [19]

Stahlecker

[11] Patent Number: 5,197,270
[45] Date of Patent: Mar. 30, 1993

[54] MAGNETIC BEARING SYSTEM FOR A SPINNING MACHINE ROTOR

[75] Inventor: Gerd Stahlecker, Eislingen/Fils, Fed. Rep. of Germany

[73] Assignees: Fritz Stahlecker; Hans Stahlecker, Fed. Rep. of Germany

[21] Appl. No.: 700,397

[22] Filed: May 15, 1991

[30] Foreign Application Priority Data

Jun. 9, 1990 [DE] Fed. Rep. of Germany ....... 4018541

[51] Int. Cl.⁵ .................. D01H 7/86; D01H 13/00
[52] U.S. Cl. .............................. 57/58.83; 57/354; 310/90.5
[58] Field of Search ............... 57/58.7, 58.76, 58.83, 57/354, 355, 356; 310/90.5

[56] References Cited

U.S. PATENT DOCUMENTS 4,380,891 4/1983 Wehrmeister ............. 57/58.83 X
4,918,345 4/1990 Vaillant de Guelis et al. ... 310/90.5

FOREIGN PATENT DOCUMENTS 3025698 2/1982 Fed. Rep. of Germany ..... 57/58.83
2450888 11/1980 France ................................ 57/354
76832 4/1991 Japan ............................... 57/58.83
989235 4/1965 United Kingdom .............. 57/58.83

OTHER PUBLICATIONS

Lecture by Karl Boden "Wide-Gap, Electro-Permanentmagnetic Bearing System with Radial Transmission of Radial and Axial Forces" Jun. 6 to Jun. 8, 1988.

Primary Examiner—Joseph J. Hail, III
Attorney, Agent, or Firm—Evenson, McKeown, Edwards & Lenahan

[57] ABSTRACT

For a balloon limiting device, which can be carried along by a travelling yarn, a magnetic bearing system is provided which suspends the balloon limiting device in the axial direction by permanent magnets and implements an electronically controlled radial stabilization having segmental coils.

4 Claims, 1 Drawing Sheet

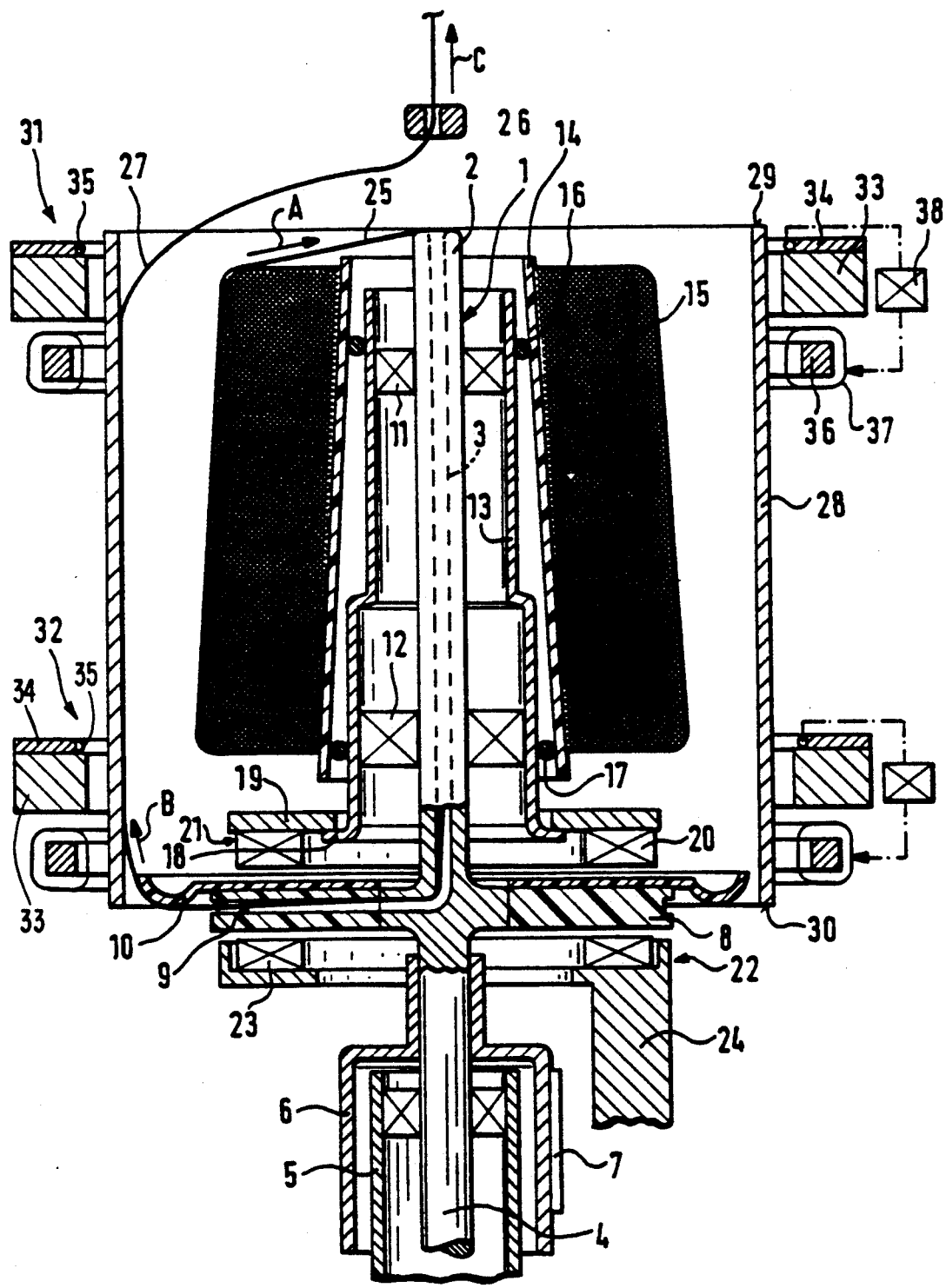

MAGNETIC BEARING SYSTEM FOR A SPINNING MACHINE ROTOR

BACKGROUND AND SUMMARY OF THE INVENTION

This invention relates to a magnetic bearing system for a rotor which consists of a magnetizable material and which, in its axial direction, is suspended by means of an axially magnetized permanent magnet ring which surrounds it and, in the radial direction, is stabilized by means of electromagnetic devices which are arranged around it in a ring shape and which can be excited by means of an electronic control device which is connected with sensors which detect the radial deviations of the rotor.

A magnetic bearing system of the initially mentioned type is known (Lecture by Karl Boden "Wide-Gap, Electro-Permanent magnetic Bearing System with Radial Transmission of Radial and Axial Forces", on the occasion of a symposium from Jun. 6 to Jun. 8, 1988 in Zürich). In the case of the known magnetic bearing system, the rotor is suspended in the axial direction by means of an axially magnetized permanent magnet ring. An active radial stabilization is provided in addition to this passive axial bearing. This radial stabilization comprises electromagnetic devices in the form of segmental coils which are disposed in pairs opposite one another and interlinked and have a common ring-shaped core which surrounds the rotor. The segmental coils, which generate radially directed magnetic fields, can be excited by way of an electronic control device to which sensors are connected which detect radial position deviations of the rotor. The signals of these sensors are analyzed in order to excite the segmental coils such that radial stabilizing forces are obtained. The known magnetic bearing system is used in such a manner that a stator of an electric motor is arranged between two magnetic bearing systems of this type and drives the magnetically disposed rotor.

It is an object of the invention to open up a new field of application for the known magnetic bearing system.

This object is achieved in that the rotor is an essentially cylindrical sleeve which is constructed as a balloon limiting device which can be carried along by a yarn and is arranged centrically with respect to a spinning or twisting spindle.

The invention is based on the recognition that, by means of a magnetic bearing system of the initially mentioned type, it is not only possible to provide the bearing for rotors driven by an electric motor but also for a sleeve, although this sleeve is driven by the carrying forces of the yarn which act not only in the circumferential direction but also have a radial force component. The active stabilization in the radial direction generates sufficiently high forces in order to keep the sleeve centered with the required precision. The suspended sleeve can therefore be disposed in a non-contact manner.

In an advantageous development of the invention, it is provided that the sleeve is disposed independently of a disk which rotates along with the spindle. As a result, it is possible to provide a balloon limiting device for a double spinning or twisting spindle which is independent of the disk and rotates independently of the disk, being taken along by the frictional force of the yarn.

Co-rotating balloon limiting devices are known in the case of double twisting spindles (Swiss Patent Document CH-PS 417 418, German Patent Document DE-PS 27 00 820), but, in the case of these types of constructions, the balloon limiting devices are fixedly mounted on the rotating disk so that they rotate together with this disk.

In the case of long sleeves, as they are required for double twisting spindles for use as balloon limiting devices, it is provided in an expedient development of the invention that the sleeve is magnetically disposed in the area of its two front ends.

In another embodiment of the invention, it is provided that the sleeve, which is used as the balloon limiting device, is arranged above a ring spindle.

It is known to provide a co-rotating balloon limiting device in the case of ring spindles (French Patent Document FR-A 24 5 888) which is aerostatically disposed. However, this type of a bearing has not been successful in machines in practice which is probably mainly the result of the risk of fly existing in spinning plants.

In the case of this type of a balloon limiting device, which has only a small axial dimension, a single magnetic bearing system is sufficient which is then expediently arranged essentially centrically with respect to the sleeve.

Other objects, advantages and novel features of the present invention will become apparent from the following detailed description of the invention when considered in conjunction with the accompanying drawings.

BRIEF DESCRIPTION OF THE DRAWINGS

The single drawing figure is an axial sectional view of a double spinning or twisting spindle, constructed according to a preferred embodiment of the invention.

DETAILED DESCRIPTION OF THE DRAWINGS

The illustrated double spindle has a spindle shaft 1, the upper part 2 of which is provided with an axial bore 3. The lower part 4 is disposed in a bearing housing 5 by means of a known bearing. A driving wharve 6 is mounted on the lower part 4 of the vertically standing spindle shaft 1. The spindle shaft 1 can be driven by way of this driving wharve 6 by means of a tangential belt 7. The tangential belt 7 moves through a machine in the longitudinal direction and in the process drives all spindle shafts 1 of one side of the machine.

A storage disk 8 is non-rotatably arranged on the spindle shaft 1 between the upper part 2 and the lower part 4. The storage disk 8 consists of a preferably nonmetallic material which permits the passing-through of lines of magnetic flux. The storage disk 8 has a radial bore 9 which is a continuation of the axial bore 3 of the upper part 2 of the spindle shaft 1. A twisting plate 10 is fixedly connected with the storage disk 8 and has a bowl shape with an upward-arching edge.

On the upper part 2 of the spindle shaft 1, a delivery spool carrier 13 is rotatably disposed by means of roller bearings 11, 12. The delivery spool carrier 13, which is essentially tube-shaped, receives a tube 14 of a delivery spool package 15. Coupling elements in the form of elastic plastic rings 16, 17 are arranged between the delivery spool carrier 13 and the tube 14 in order to achieve a non-rotatable connection which is as non-positive as possible. At its lower end facing the storage disk 8, the delivery spool carrier 13 is provided with a collar 18 to which a ring disk 19 is fastened which is made of a magnetizable material, particularly steel. On its side facing the storage disk 8, the ring disk 19 carries permanent magnets 20 which are uniformly distributed over the circumference and are arranged in the shape of a ring 21. The individual permanent magnets 20 are arranged such that their polarity changes; i.e., that a permanent magnet 20 with a downward-pointing north is followed by a permanent magnet 20 with a downward-pointing south.

On the side of the storage disk 8 which is opposite in the axial direction, a ring 22 is arranged which has additional permanent magnets 23 which are held by a stationary holder 24. The permanent magnets 23 also have an alternating polarity, being arranged such that one pulse of one permanent magnet 20 respectively is opposite a pole of a permanent magnet 23 that is in the opposite direction. By means of the permanent magnet rings 21, 22, the delivery spool carrier 13 with the delivery spool package 15 is held stationary despite the rotating spindle shaft 1.

During the operation, a yarn 25 is withdrawn from the delivery spool package 15 in the direction of the arrow (A) and travels into the axial bore 3. The yarn 25 will then leave the spindle shaft 1 by way of the radial bore 9 of the storage disk 8 and subsequently will be guided upward in the direction of the arrow B back to the yarn guide 26 which is arranged centrally above the spindle shaft 1. Subsequently, the yarn 25 will be wound onto a spool package which is not shown. The yarn 25, which is deflected by the twisting plate 10, forms a balloon 27 the diameter of which is limited by a balloon limiting device 28. The balloon limiting device 28 is arranged centrally with respect to the spindle shaft 1 and extends along the height of the delivery spool to the area of the twisting plate 10.

The balloon limiting device 28 consists of a cylindrical sleeve made of a ferromagnetic material which, by means of a magnetic bearing, independently of the spindle shaft 1 and the storage disk 8, is disposed in a part of a machine frame which is not shown.

The magnetic bearing system comprises two magnetic bearings 31, 32 which are arranged in the area of the end faces 29 and 30. Each magnetic bearing 31, 32 first contains an axially magnetized permanent magnet ring 33 which has an essentially square cross-section. The two permanent magnet rings 33 suspend the balloon limiting device 28 in its axial direction. The two permanent magnet rings 33, which preferably consist of barium ferrite, are each covered on the upper or lower end side with a steel plate 34 used for concentrating the lines of magnetic flux. Each of these steel plates 34 comprises several sensors 35 which are uniformly distributed in the circumferential direction and the number of which may be between three and eight. These sensors 35, which are intersected by the lines of magnetic flux, consist of a material which changes its resistance as a function of the intensity of the lines of flux. Since the intensity of the lines of flux depends on the size of the ring gap between the sensors 35 and the balloon limiting device 28, these sensors 35 emit signals which are representative of the ring gap and particularly of a change of the ring gap. These signals are routed to an electronic control device 38 which analyzes these signals for a radial stabilization of the balloon limiting device 28.

Each magnetic bearing 31, 32 comprises a ring-shaped soft-iron core 36 which centrally surrounds the balloon limiting device 28. Sequential coils 37 are arranged along the circumference of the core 36 and, in a diametrically opposite manner, are interlinked in pairs. Preferably, a total of four such segmental coils 37 interlinked in pairs are provided which are arranged symmetrically. These segmental coils 37 are excited in a manner controlled by the electronic control device 38 in order to compensate radial deviations of the balloon limiting device 28 from its radial operating position an therefore stabilize it.

The balloon limiting device 28 is therefore disposed in a no-contact manner. It can therefore be taken along in a relatively easy manner by the travelling yarn 25 in the circumferential direction as a result of the occurring frictional forces. As a result of the corotating balloon limiting device 28, relatively low relative speeds occur between the yarn 25 and the balloon limiting device 28 which are essentially limited to the withdrawal speed of the yarn. As a result, there is only a relatively slight heating of the yarn 25 so that particularly the "burning-up" is avoided which is a risk in the case of synthetic yarns.

As a deviation from the shown embodiment, it is provided in another embodiment that only one permanent magnet ring 33 is provided. This permanent magnet ring 33 is expediently provided with steel plates 34 and sensors 35 on both end sides so that then the cores 36 with the segmental coils 37 can also react to rocking motions.

In the case of balloon limiting devices 28, which require only a relatively slight axial dimension, as, for example, in the case of ring spindles, under certain circumstances, a single magnetic bearing 31 or 32 may also be sufficient for securely centering such a balloon limiting device 28.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An assembly comprising:
    a spinning or twisting spindle,
    a rotor in the form of a cylindrical yarn balloon limiting device arranged centrically with respect to the spindle, said rotor comprising magnetizable material,
    an axially magnetized permanent magnet ring surrounding and axially supporting the rotor,
    sensors for detecting radial deviations of the rotor from a predetermined desired radial position,
    electromagnetic devices arranged around the rotor for controlling radial movement of the rotor, and
    an electronic control device for controlling the electromagnetic devices to radially stabilize the rotor at its predetermined radial position in response to signals from the sensors,
    wherein the spinning or twisting assembly is a double or two for one spinning or twisting assembly is a double or two for one spinning or twisting spindle assembly including a disk, and wherein the rotor rotates independently of the disk in response to frictional force of the yarn acting thereon.

2. An assembly according to claim 1, wherein two permanent magnet rings are provided, wherein the rotor serving as the balloon limiting device is magnetically disposed in the area of its two opposite axial end faces by means of the permanent magnet rings.

3. An assembly according to claim 1, wherein respective ones of two sets of said electromagnetic devices is arranged around the rotor at each of respective opposite axial end face regions of the rotor.

4. An assembly according to claim 1, wherein respective ones of two sets of said electromagnetic devices is arranged around the rotor at each of respective opposite axial end face regions of the sleeve.

* * * * *